Patented May 24, 1938

2,118,512

UNITED STATES PATENT OFFICE

2,118,512

MANUFACTURE OF BLACK LAKE PIGMENTS

Robert T. Hucks, South River, N. J., assignor to E. I. du Pont de Nemours & Company, Wilmington, Del., a corporation of Delaware No Drawing. Application February 6, 1936, Serial No. 62,631

9 Claims. (Cl. 134—58.5)

This invention relates to an improved black pigment and the preparation of the same, and more particularly to a lake type black base pigment on which is precipitated a suitable black dye.

Heretofore, lakes have been fairly well known in the art and are usually considered to be pigments which have been formed by precipitating a dye on a semi-transparent base or substratum. They are clearly distinguishable from precipitated pigments such as chrome yellow and Chinese blue in that the latter are precipitated from solution in the absence of a substratum, whereas lakes are dyes which are precipitated on particles which are usually insoluble or are rendered insoluble by certain chemical reactions. Lakes are further distinguishable from dyes by the fact that the latter are soluble in water or organic solvents, whereas lakes are not completely soluble and more usually are practically insoluble in water or other solvents. Common substrata used in the preparation of lake pigments are hydrated aluminum oxide, barium sulphate, and blanc fixe. These and the other commonly used bases are practically transparent.

It has also been proposed to precipitate certain dyes such as nigrosine on the substrata mentioned above. As far as color is concerned, excellent black lakes can be prepared by this method. A lake prepared by precipitating nigrosine on hydrated aluminum oxide as a base is insoluble in water and most organic solvents; it has, however, characteristics which limit its use greatly. It is a very hard pigment and requires a great deal of energy to bring it into condition for incorporating it in paints and lacquers. Ordinary methods of dispersing pigments such as rolling or kneading cannot be used successfully in connection with a pigment of this type. The pigment also has comparatively poor hiding power and consequently must be used in coating compositions in relatively large percentages which in turn adds to the expense of preparation.

In order to obviate the difficulties encountered in the preparation of such pigments, it has been proposed to prepare coloring matter merely by mixing dyes and pigments.

For example, spirit-soluble black dyes such as nigrosine or induline base are mixed with carbon black and are then dispersed as usual in part of the paint or lacquer vehicle. The results from such a process are fairly satisfactory, but present the disadvantage that in the case of nitrocellulose lacquers they bleed when light colored overstripes are made on the black background. It has also been proposed to substitute a water-soluble dye for one soluble in organic solvents and in such cases the bleeding characteristic is greatly reduced, but unfortunately the water-soluble dyes are so hard that they can be ground only with great difficulty and if not properly dispersed the color is little if any better than ordinary carbon black lacquers.

An object of the present invention is the provision of a black lake pigment which has satisfactory hiding power, excellent color, soft texture, and one which is easily dispersed in ordinary vehicles. Another object is the provision of a black lake pigment which does not bleed when made into coating compositions containing organic solvents and which when dry has excellent durability. A still further object of this invention is to provide a method for preparing carbon black lacquers and paints with a greatly improved color by a simple and economical process. Other objects will appear hereinafter.

These objects are accomplished by precipitating suitable dyes on a substratum of black pigment.

In the practice of this invention, a water slurry of carbon black is prepared and to this is added a solution of a black dye. The dye is then precipitated onto the carbon black particle by the addition of a precipitating medium such as barium chloride. The following examples will illustrate certain of my preferred methods of carrying out the invention. However, it will be understood that they are given by way of illustration only and not by way of limitation.

Example I 100 grams of good quality carbon black such as that known to the trade as "Super Spectra" is well slurried in a liter of water and then made up to five liters by the addition of more water. In another vessel, 12½ grams of nigrosine are dissolved in a liter of hot water at about 175° F. The dye solution is then slowly added to the carbon black slurry with agitation. This should take about 10 minutes; the material is then stirred for another 10 minutes, and the temperature is adjusted to 140° F. In another vessel, 8 grams of barium chloride are dissolved in about 250 cc. of water at 140° F. This solution is then added slowly, which should take about 20 minutes, to the carbon black-nigrosine slurry and the entire mass is stirred for about an hour and then sufficient water is added to bring the volume to about 18 liters. The slurry is then allowed to stand and the supernatant liquid is withdrawn and the lake is washed until free from chloride. The black pigment is then filtered by any convenient method and dried at 140° F.; when dry, it may be ground by any method used for dry grinding.

Example II 25 grams of Pontachrome blue black R, an acid dye, is dissolved in 500 cc. of water at about 195° F. The solution is maintained at this temperature and 12½ grams of acetic acid (100%) are added. A slurry of carbon black is prepared as in Example I and the dye is added to the slurry slowly, taking about 5 minutes. The temperature is adjusted to 195° F. and 3 grams of sodium bichromate dissolved in 100 cc. of boiling water are added, drop by drop, which ordinarily takes about 15 minutes. The temperature of the mixture is maintained at 195° F. for about an hour, and a solution of 15 grams of barium chloride in 300 cc. of water at 85° F. is added slowly which should take about 10 minutes. The mixture is then agitated for about an hour and the volume made up to one liter with water. The supernatant liquid is drawn off and water is added as before, and when the pigment settles, the supernatant liquid is again withdrawn. The pigment is then filtered and dried at 140° F. It may then be ground and used in any desired manner.

Example III

This example illustrates the preparation of a cellulose derivative coating composition in which the pigment has been made according to the herein disclosed invention.

| | Per cent by weight |
|---|---|
| Black lake | 2.00 |
| Dibutyl phthalate | 5.00 |
| Nitrocellulose (½ sec.) | 12.50 |
| Ester gum | 8.00 |
| Denatured alcohol | 6.00 |
| Ethyl acetate | 14.50 |
| Butyl acetate | 14.00 |
| Amyl acetate | 3.00 |
| Toluol | 35.00 |
| | 100.00 |

The black lake used in the above formula may be one prepared according to Example I. The plasticizer in this example as well as other cellulose derivative coating compositions may be any of the known plasticizers, but usually I prefer solvent plasticizers such as tricresyl phosphate, dibutyl phthalate, etc., either alone or in combination with castor oil. Black lacquers of the type given in this example may be compounded by any of the well known methods. I have found that kneading or rolling the pigment, nitrocellulose, alcohol, and plasticizer until dispersion is effected and then adding the proper solvents and resin is very satisfactory.

Example IV

This example illustrates the preparation of a coating composition containing a black lake and a polyhydric alcohol-polybasic acid type resin:

| | Per cent by weight |
|---|---|
| Black lake | 3.00 |
| Synthetic resin | 32.00 |
| High flash naphtha | 36.00 |
| Mineral spirits (B. P. 150 to 215° C.) | 29.00 |
| | 100.00 |

If it is desired, driers such as manganese compounds may be added to the above material. The resin used in this example is a condensation product of a polyhydric alcohol and a polybasic acid modified with a drying oil. The particular alkyd resin used in the above example was the reaction product of:

| | Parts by weight |
|---|---|
| Glycerine | 12.0 |
| Linseed oil | 51.0 |
| Phthalic anhydride | 37.0 |
| | 100.0 |

The black lake used in the above example was prepared according to Example II. The finished composition was made by grinding the black lake, resin, and part of the solvents in a ball mill, after which the remaining ingredients of the formula were added.

The carbon black in the above examples may be any good grade of carbon such as that known to the trade as Super Spectra carbon black. It has been found that this brand or the equivalent of carbon black when used as a substratum in the present invention produces a coating composition having a degree of jetness which has heretofore been impossible to obtain by any practical method.

The invention, however, is not limited to the use of high grade and expensive carbon blacks since one of the advantages of the present invention resides in the fact that cheaper grades which do not ordinarily possess the degree of jetness found in the better grades may be used for the production of coating compositions having a very satisfactory color. It is also not necessary that carbon black; that is, gas black, be used since the process herein disclosed is also applicable to lamp black and bone black. The invention also is not limited to the acid dyes mentioned above since practically any of the well known acid dyes of this type may be used, or the so-called basic dyes that are precipitated by such reagents as tannic acid, phosphotungstic acid, and the like may be used. The practice of the invention is not limited to the ratio of ingredients shown in the examples; for example, while I prefer to use one part by weight of dye to about seven parts by weight of carbon black, I may vary this ratio to one part of dye to sixteen parts of carbon or as much as one part of dye to one part of carbon, and even this range may be broadened in certain cases. For example, in the case of bone black as little as one part of dye to twenty parts of black may be used, although the ultimate jetness of the product is dependent to a large extent on the amount of dye used.

The advantage of the herein disclosed invention resides in the fact that the products obtained have an excellent color and hiding power, they may be easily ground, and have a soft texture, and when suitable dyes are selected the resulting lakes are non-bleeding and yield a coating composition of fine appearance and durability.

The pigments herein disclosed are not limited in use to the preparation of coating compositions, but may likewise be used to good advantage in the manufacture of rubber and in making molded plastics. They are particularly useful in this connection since cheaper grades of carbon black may be used and very satisfactory color obtained. It appears that it is probable that each particle of carbon black is surrounded by a film of dye; in other words, the pigment may be considered as minute particles of dye with a core of opaque carbon. While this theory is believed to be the most logical explanation, I do not wish to be limited thereby.

It is apparent that many widely different embodiments of this invention may be made without departing from the spirit and scope thereof; and, therefore, it is not intended to be limited except as indicated in the appended claims.

I claim:

1. The process of producing jet black pigments which comprises forming a slurry of carbon black, preparing a solution of a soluble black acid dye, mixing the said slurry into the solution, and adding thereto a precipitant for the dye.

2. The process of producing jet black pigments which comprises forming a slurry of about ten parts of carbon black in one hundred parts of water and diluting the slurry with about four hundred more parts of water, preparing a solution of about 12.5 grams of acid nigrosine per liter of hot water, mixing the solution and the slurry with stirring, and adjusting the temperature to about 140° F., adding a solution of barium chloride thereto, stirring the mass for about an hour, and filtering and drying the black lake pigment formed thereby.

3. A black pigment comprising carbon black having a black acid dye precipitated on the particles thereof.

4. A coating composition containing a black lake pigment comprising carbon black having a black acid dye precipitated on the particles thereof.

5. Product of claim 4 in which the coating composition contains a cellulose derivative.

6. Product of claim 4 in which the coating composition contains a resin.

7. Process of claim 1 in which the ratio of carbon black to dye is between one part of carbon black to one part of dye to sixteen parts of carbon black to one part of dye.

8. Product of claim 4 in which the ratio of carbon black to dye is between one and sixteen parts of carbon black to each part of dye.

9. Process of claim 1 in which the precipitant is a barium salt.

ROBERT T. HUCKS.